May 14, 1940.　　L. A. JOHNSON ET AL　　2,200,925
FLUID SEAL
Filed March 6, 1939
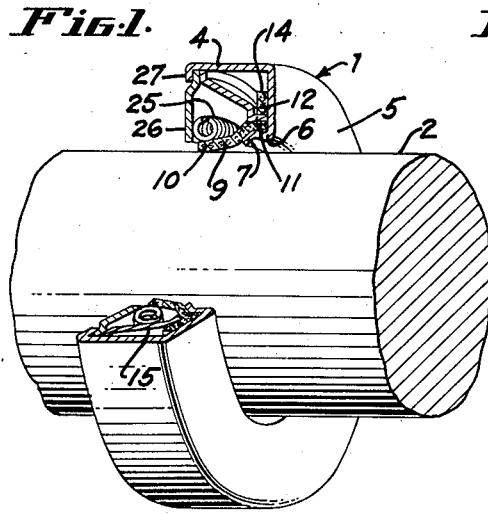
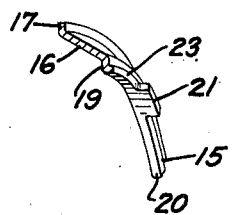
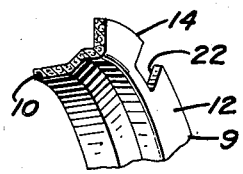
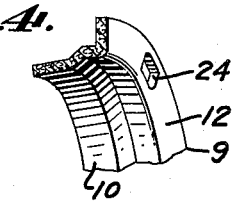
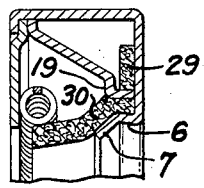
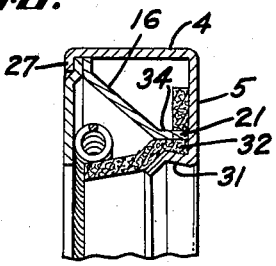
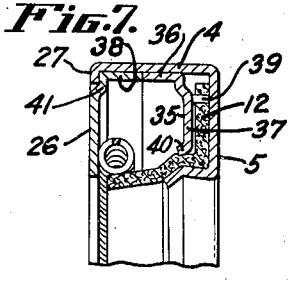
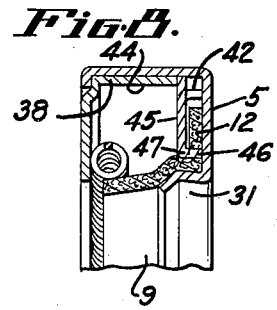
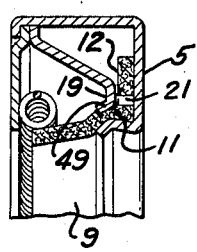
INVENTORS
LLOYD A. JOHNSON
ALLISON DONHAM OWEN
BY
　　ATTORNEY.

Patented May 14, 1940

2,200,925

UNITED STATES PATENT OFFICE 2,200,925

FLUID SEAL

Lloyd A. Johnson, Hillsborough, and Allison Donham Owen, Berkeley, Calif., assignors to National Oil Seal Co., Oakland, Calif., a corporation of Nevada Application March 6, 1939, Serial No. 259,992

3 Claims. (Cl. 288—3)

This invention relates to fluid seals and more particularly to a self-contained fluid seal which is arranged to be placed around moving shafts or on moving shafts or similar parts to retain fluid within a housing from which the shaft projects and to prevent the fluid from leaking out along the shaft where seepage would otherwise occur.

Among other things, it is an object of the present invention to provide a unitary seal structure composed of two or more stampings arranged so that the flexible sealing member may be clamped between two adjacent axially extending spaced flanges formed on a pair of said stampings; to provide means allowing the inner clamping member to seat against a radial portion formed on the outer cage member so that when the cage members are secured together, they will always be in the same nested relation, thereby assuring in quantity production a uniform width to the cage housing and an accurate uniform positioning of the two adjacent spaced axial clamping flanges; to provide a unitary seal structure wherein the clamping pressure exerted between the cage members and the sealing member is entirely radial; to provide a novel form of cage structure wherein one of the clamping members is arranged to prevent rotation of the flexible sealing member; to provide a novel form of cage structure permitting assembly of the device after forming the axial spaced clamping members; to provide a novel form of cage structure employing a dished clamping member which tightens its hold on the sealing member when the cage parts are finally assembled; to provide a cage structure having a clamping member formed in two or more parts and arranged to tighten its hold when the cage parts finally are assembled; to provide a novel form of cage structure wherein a resilient sealing member is used having an S-shaped section; to provide a unitary seal using an S-shaped sealing member having a radial flange extending therefrom within said cage and to provide a construction of maximum simplicity, economy and ease of assembly, and such further objects, advantages and capabilities as will later more fully appear and as are inherently possessed by said structure.

The invention possesses other objects and features of advantage, some of which, with the foregoing, will be set forth in the following description of a preferred form of our invention which is illustrated in the drawing accompanying and forming a part of the specification. It is to be understood that we do not limit ourselves to the showing made by the drawing and description as we may adapt a variation of the preferred form within the scope of our invention as set forth in the claims.

One of the important elements in the present invention is the use with a resilient annular sealing member having its cross-section in the form of an elongated S, and having a radial flange portion at the end opposite the sealing lip, of an outer cage member having a peripheral portion and a short pre-formed axial portion connected to the peripheral portion by a radial wall, together with a nesting member also having a pre-formed axially extending portion, which latter portion effects a clamping of the resilient sealing member solely by virtue of radial pressure against the short pre-formed axial portion of the cage member referred to above. This accomplishes a secure anchoring of the flexible or resilient sealing member in the cage parts without requiring that any sealing pressure be exerted against the radially extending portion of the flexible member. This effects an important economy from the standpoint of cost of manufacture inasmuch as it is not necessary to particularly form or trim the periphery of the radially extending flange portion of the flexible sealing member, but the same may be inserted in the cage just as it comes from the molding or forming operation. The radial flange portion left on the sealing member assists in maintaining the annular shape of the washer before and during assemblage of the parts.

The invention may be better understood by reference to the drawing, wherein:

Fig. 1 is a perspective view, partially in section, of one form of our seal in position on a shaft, showing the inner cage member with a web extending diagonally across the outer cage member;

Fig. 2 is a fragmentary perspective view of the inner cage member of Fig. 1, showing one of the axial spacing studs;

Fig. 3 is a fragmentary perspective view of the resilient sealing washer, showing a slot for receiving a spacing stud;

Fig. 4 is a view similar to Fig. 3, but showing a preformed aperture to receive a stud;

Fig. 5 is a fragmentary view, partially in section, of a modification wherein the radial flange of the washer is compressed to half the thickness of the S-shaped portion;

Fig. 6 is a fragmentary view, partially in section, of a seal showing a modification in the shape of the inner cage member;

Fig. 7 is a fragmentary view, partially in section, showing another modification of the inner cage member, wherein the diagonal web is replaced by a radial flange;

Fig. 8 is another modification using a radially flanged inner cage member; and

Fig. 9 shows a further modification of Fig. 1.

It may be seen from the drawing and the following description that our invention is equally applicable to those cases where the sealing lip extends outwardly from the main body of the seal to form an "external" contact, as well as to those cases in which it extends inwardly therefrom to form an "internal" contact.

We prefer to fix the seal in a non-rotative position in a housing bore or on a shaft by a press fit. The outside diameter of the cage on an "internal" seal is made several thousandths of an inch oversize to provide a press fit with the housing bore. An "external" seal has the inside cage diameter made several thousandths of an inch undersize to provide a press fit when it is forced over a shaft. Such force fitting of the cage and shaft or housing surface provides a leak-tight joint between that portion of the housing or shaft and the body of the seal, and fixes the position of the seal body relative thereto while maintaining the proper position of the flexible sealing washer relative to the surface to be sealed. By "surface to be sealed" throughout this application, we mean the surface against which a portion, called the "sealing lip," of the flexible sealing washer is to be held in contact under such pressure as will permit relative movement of the parts while preventing the passage thereby of oil or other liquid being retained.

In Fig. 1, we have shown an internal unitary seal 1 disposed around a shaft 2. It is to be understood that the cylindrical outer wall 4 of seal 1 is press-fitted or otherwise secured in a housing, not shown in the drawing, between which housing and the shaft 2 it is desired to prevent passage of the substance being sealed. A radial wall 5 extends inward from wall 4, bounded at its inner periphery by a short axially extending flange 6, preferably inclined slightly away from the shaft 2. Cylindrical wall 4 and axial flange 6 extend in the same general direction from radial wall 5. The free edge of axial flange 6 is bent toward the surface of shaft 2, constituting a skirt 7 which acts as a reinforcement or backing for the annular flexible sealing washer 9. Flange 6 is so positioned that a substantial separation exists between it and the surface of shaft 2.

Washer 9 may be formed of leather or any equivalent sealing material which has the necessary characteristics, such as flexibility, moldability, resistance to heat, and imperviousness to the material to be retained by the seal. We prefer to form it with a cross-section like an S, substantially elongated in a direction parallel to shaft 2, one end of the S constituting the sealing lip 10 and being of diameter suitable to engage the surface to be sealed, the other end of the S being a clamping portion 11 of diameter suitable to be secured against the short axial flange 6 and the reinforcing skirt 7. At the extremity of the clamping portion 11, we form a radial flange 12 with a substantially right angle bend on the inside so that when assembled as shown in Fig. 1, there is no contact between the radial portions and the inner clamping member. This flange is useful principally in maintaining the circular washer 9 against rotation and is also of value before assembly in preserving the shape of washer 9. The external diameter of this flange is immaterial so long as it does not exceed in radial extent the inner diameter of the cage. Another advantage is that one labor operation is avoided, since the peripheral edge 14 need not be trimmed to circular shape, but may be left irregular, just as it comes from the molding operation. It is possible to leave it irregularly shaped, because no sealing is effected by clamping on the radial flange. The only sealing is along the axial portion 11.

An inner cage member 15 is used to hold the flexible member securely against flange 6 and skirt 7. Details of its construction are shown in Fig. 2. A frusto-conical web 16 may have a radial flange 17 at one edge, and another radial flange 19 at the opposite edge; from flange 19 a short axial flange 20 is formed, in continuation of which extend a number of uniformly spaced studs or spacers 21. The radial flange 12 of washer 9 is preformed with slots 22 extending to the periphery 14, as shown in Fig. 3, or with perforations 24, as shown in Fig. 4. The spacers 21, which bear against end wall 5, function to keep the clamping flange in correct predetermined position with relation to the cooperating axial flange 6 and skirt 7, thereby assuring a uniform result in quantity production. The spacers 21 also function to hold the radial face of flange 20 out of clamping engagement with the radial flange 12 of washer 9, thereby assuring that the sole clamping will be on the axial portion 11 between flanges 20 and 6. A further advantage of avoiding any clamping of radial flange 12 of washer 9, prevented by means of spacers 21, results from the fact that leather thicknesses vary, and in constructions where the clamping is done on the radial flange, these variations in leather thickness may result in corresponding variations in over-all cage thickness.

Assembly is preferably effected by first positioning the sealing member in the outer cage with the radial flange 12 in contact with the inner face of cage wall 5. For certain types of uses it may be advantageous to apply cement between these contacting faces before they are thus assembled. The next step is to aline the spacers 21 with the perforations 24 or slots 22, and then to insert the inner cage member with pressure until the spacers 21 come to rest against the inner face of cage wall 5. Pressure is needed because the relative diameters of flanges 6 and 20 is such that the sealing member 11 is considerably compressed between them. Here is where the fluid tight joint is effected between the sealing member and the cage parts. No sealing contact is made between the radial face 23 and the radial flange 12 of washer 9, because the spacers 21 are intentionally made longer than the thickness of flange 12 to prevent it.

A suitable garter spring 25 is placed around the sealing portion 10 of the flexible washer, and an annular radial plate 26 which is of substantially the same outside diameter as the inner cage member is placed thereover. A radial flange 27 is then spun down from the cylindrical wall 4 of the outer cage to hold the entire unit securely assembled. It will be seen from an inspection of the figures that the spinning down of the radial flange 27 holds the inner cage member tightly against the radial wall 5 of the outer cage.

In some cases we prefer to reduce the thickness of the radial flange portion 12 of washer 9 to approximately half the thickness of the remainder of the S-shaped sealing member. This is easily accomplished during molding. Such construction is shown in Fig. 5, wherein we have shown a radial washer flange 29 which is compressed to half the thickness of the remainder of the washer.

In most cases we find it desirable in order to secure a proper clamping between the washer and the inner cage member to bend the axial flange 6 slightly inwardly away from the shaft 2. Such an embodiment is shown, for instance, in Fig. 6, wherein an axial flange 31 is bent slightly more than 90° from the plane of radial walls 5, producing a keystoned section 32 in the clamped portion of the washer. In this figure we have also shown a modification of the inner cage member wherein an axial flange 34 is substituted for the radial flange 19 of the previously described embodiments. A similar clamping effect between the flange 34 and the corresponding part of the outer cage member is obtained. As before, the axial studs or spacers 21 of the inner cage member bear against the radial wall 5 of the outer cage member and transmit thereto all of the axial components of the compressive stress induced in the web 16 by the spinning down of radial flange 27 from the cylindrical wall 4 of the outer cage, leaving only the radial components of that compressive stress to effect the secure clamping of the washer member.

In some cases it may be desirable to substitute for the conical web 16 a radial wall extending normally to shaft 2. In such a case the construction we have shown in Fig. 7 may be used. Here we have shown an inner cage member having a radial closure wall 26, and cylindrical flange 38 which nests snugly within outer cage cylindrical wall 4 and extends therealong for a substantial fraction of the axial extent thereof. A second inner cage member 35 comprises a cylindrical flange 36, also nesting snugly within outer cage cylindrical wall 4, and having a radial wall 37 from which is turned a short axial flange 40 arranged to clamp the sealing member by radial pressure in the same fashion as did the radial pressure component exerted upon the inner cage member in the previously described embodiments. These two inner cage members can be made by the same die. Cage member 35 is then put through an additional die to form spacers 39 and axial flange 40.

In Fig. 8 we have shown another variation of the construction of Fig. 7, wherein the cylindrical wall 38 is extended at 44 substantially across the seal to retain an inner cage member 45 which in this case may be a flat annular plate having spacers 42 and 46 disposed about the periphery of the radial washer to extend through slots 22 in sealing member 9 and into contact with wall 5 of the outer cage. In this construction also it will be seen that the entire sealing between the washer and the cage is produced by radial pressure between the axial flange 31 and a flange 47 turned from plate 45, while the spacing studs 42 and 46 prevent any sealing pressure being exerted by the inner cage member against the radial flange 12 of washer 9. Also, the studs 46 prevent washer 9 from rotating about the axis of the seal.

In Fig. 9, we have shown still another variation of the fundamental form in Fig. 1, wherein a flange 49 similar to flange 40 of Fig. 7 extends from the inner cage radial flange 19 and assists in forming a tight fit along the axial flange 11 of sealing member 9.

It will be obvious that in this construction, as well as in any of those above described, it will be possible to cement the radial flange 12 of washer 9 to the inner surface of radial wall 5 of the outer cage member.

The invention is susceptible of other variations in construction within the terms of the claims, as will be obvious to those skilled in the art. The arrangement we have set forth is applicable equally as well to "external" as to "internal" seals. All such differences, as well as substitutions of materials and changes in proportions are deemed to fall within the scope of the appended claims.

What we claim is:

1. A unitary fluid seal adapted to seal the space between two relatively moving cylindrical surfaces, comprising an outer cage member having an axial flange spaced from and adjacent to the movable surface being sealed, and a radial wall portion supporting said flange, another cage member having an axial flange concentric with and spaced from the aforesaid axial flange to form therewith a pair of clamping jaws, and a plurality of axially extending fingers projecting beyond the face of the rim of said last-named axial flange, and a flexible sealing member having an axial sealing lip portion to contact the movable surface being sealed, an axial portion spaced radially from the aforesaid axial portion, and clamped in the aforementioned jaws, a flexible portion connecting said axial portions, and a radial positioning flange portion formed on the inner edge of said clamped axial portion and extending radially in the space provided by said fingers between said rim and said radial wall portion of said cage members.

2. A unitary fluid seal adapted to seal the space between two relatively moving cylindrical surfaces, comprising an outer cage member having an axial flange spaced from and adjacent to the movable surface being sealed, and a radial wall portion supporting said flange, another cage member having an axial flange concentric with and spaced from the aforesaid axial flange to form therewith a pair of clamping jaws, and a plurality of axially extending fingers projecting beyond the face of the rim of said last-named axial flange, and a flexible sealing member having an axial sealing lip portion to contact the movable surface being sealed, an axial portion spaced radially from the aforesaid axial portion and clamped in the aforementioned jaws, a flexible portion connecting said axial portion, and a perforated radial positioning flange portion formed on the inner edge of said clamped axial portion and extending radially in the space provided by said fingers between said rim and said radial wall portion of said cage members, said fingers projecting through said perforations.

3. A unitary fluid seal adapted to seal the space between two relatively moving cylindrical surfaces, comprising an outer cage member having an axial flange spaced from and adjacent to the movable surface being sealed, and a radial wall portion supporting said flange, another cage member having an axial flange concentric with and spaced from the aforesaid axial flange to form therewith a pair of clamping jaws, and a plurality of axially extending fingers projecting beyond the face of the rim of said last-named axial flange, a flexible sealing member having an axial sealing lip portion to contact the movable surface being sealed, an axial portion spaced radially from the aforesaid axial portion and clamped in the aforementioned jaws, a flexible portion connecting said axial portions, and a radial positioning flange portion formed on the inner edge of said clamped axial portion and extending radially in the space provided by said fingers between said rim and said radial wall portion of said cage members, a resilient pressure applying means bearing on the axial sealing lip portion of the sealing member, and a cage closure member positioned adjacent the sealing lip.

LLOYD A. JOHNSON.
ALLISON DONHAM OWEN.